United States Patent
Etori et al.

(10) Patent No.: US 11,440,544 B2
(45) Date of Patent: Sep. 13, 2022

(54) VEHICLE CONTROL METHOD AND VEHICLE CONTROL DEVICE

(71) Applicant: Nissan Motor Co., Ltd., Yokohama (JP)

(72) Inventors: Nariaki Etori, Kanagawa (JP); Ryuji Kurosaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 200 days.

(21) Appl. No.: 16/317,006

(22) PCT Filed: Jun. 6, 2017

(86) PCT No.: PCT/JP2017/020984
§ 371 (c)(1),
(2) Date: Jan. 10, 2019

(87) PCT Pub. No.: WO2018/012147
PCT Pub. Date: Jan. 18, 2018

(65) Prior Publication Data
US 2019/0210600 A1 Jul. 11, 2019

(30) Foreign Application Priority Data
Jul. 12, 2016 (JP) .............................. JP2016-137979

(51) Int. Cl.
*B60W 30/17* (2020.01)
*G08G 1/16* (2006.01)
(Continued)

(52) U.S. Cl.
CPC ............. *B60W 30/17* (2013.01); *B60R 21/00* (2013.01); *B60W 30/14* (2013.01); *B60W 50/10* (2013.01);
(Continued)

(58) Field of Classification Search
CPC ...... B60W 30/17; B60W 30/14; B60W 50/10; B60W 50/14; B60W 2554/804;
(Continued)

(56) References Cited

U.S. PATENT DOCUMENTS 6,116,369 A 9/2000 King et al.
6,370,471 B1 * 4/2002 Lohner ................ G05D 1/0257
73/178 R
(Continued)

FOREIGN PATENT DOCUMENTS

EP 2835790 A1 2/2015
JP 2000313247 A * 11/2000
(Continued)

*Primary Examiner* — Maceeh Anwari
*Assistant Examiner* — Charles Pall
(74) *Attorney, Agent, or Firm* — Young Basile Hanlon & MacFarlane, P.C.

(57) ABSTRACT

A control method and a control apparatus for a vehicle are provided which allow a subject vehicle to start moving at an appropriate time during automated travel control in which the subject vehicle is controlled to make a stop without depending on a brake operation performed by the driver. The control method includes executing the automated travel control in which the subject vehicle is controlled to make a stop without depending on the braking operation performed by the driver, and when detecting a stop of a preceding vehicle during execution of the automated travel control, presenting start-moving command information for reminding the driver of a start-moving command for the subject vehicle.

9 Claims, 5 Drawing Sheets

(51) Int. Cl.
  *B60R 21/00* (2006.01)
  *B60W 50/10* (2012.01)
  *B60W 30/14* (2006.01)
  *B60W 50/14* (2020.01)

(52) U.S. Cl.
  CPC ............... *B60W 50/14* (2013.01); *G08G 1/16* (2013.01); *B60W 2520/04* (2013.01); *B60W 2540/12* (2013.01); *B60W 2540/18* (2013.01); *B60W 2554/804* (2020.02)

(58) Field of Classification Search
  CPC ......... B60W 2520/04; B60W 2540/12; B60W 2540/18; B60R 21/00; G08G 1/16
  See application file for complete search history.

(56) References Cited

U.S. PATENT DOCUMENTS

| | | |
|---|---|---|
| 2005/0187697 A1 | 8/2005 | Arai et al. |
| 2006/0212207 A1 | 9/2006 | Sugano et al. |
| 2009/0135049 A1 | 5/2009 | Kikuchi |
| 2009/0192686 A1 | 7/2009 | Niehsen et al. |
| 2010/0204897 A1* | 8/2010 | Labuhn .................. B60K 31/02 701/93 |
| 2010/0280728 A1* | 11/2010 | Labuhn .................. B60W 10/22 701/93 |
| 2010/0286887 A1* | 11/2010 | Maruyama .......... B60W 10/184 701/96 |
| 2012/0239265 A1* | 9/2012 | Kato ................. B60W 30/0953 701/70 |

FOREIGN PATENT DOCUMENTS

| | | | |
|---|---|---|---|
| JP | 2000313247 A | | 11/2000 |
| JP | 2001209900 A | | 8/2001 |
| JP | 2003201881 A | | 7/2003 |
| JP | 2006290328 A | | 10/2006 |
| JP | 2008044421 A | | 2/2008 |
| JP | 2009128275 A | | 6/2009 |
| JP | 2010-285145 A | | 12/2010 |
| JP | 2013057321 A | | 3/2013 |
| JP | 2013123993 A | * | 6/2013 |
| JP | 2013123993 A | | 6/2013 |

* cited by examiner

VEHICLE CONTROL METHOD AND VEHICLE CONTROL DEVICE

CROSS REFERENCE TO RELATED APPLICATION

The present application claims priority to Japanese Patent Application No. 2016-137979, filed Jul. 12, 2016, incorporated herein in its entirety.

TECHNICAL FIELD

The present invention relates to a control method and a control apparatus for a vehicle that control travel of a subject vehicle and presentation of information.

BACKGROUND

A notification apparatus has heretofore been known for the follow-up travel control of following a preceding vehicle (e.g. JP2001-209900A). The notification apparatus is used for controlling a subject vehicle to make a stop when the preceding vehicle makes a stop. Then, when the preceding vehicle starts moving and the distance between the preceding vehicle and the subject vehicle becomes a certain distance or more, the notification apparatus notifies that the preceding vehicle starts moving.

However, if the start of the preceding vehicle is notified after the distance between the preceding vehicle and the subject vehicle becomes a certain distance or more, a time lag will occur from when the preceding vehicle starts moving to when the subject vehicle starts moving. There is therefore a problem in that the subject vehicle gets delayed from the preceding vehicle when the subject vehicle starts moving as compared with a case in which the driver drives the subject vehicle by himself/herself, and the subject vehicle cannot properly follow the preceding vehicle.

SUMMARY

A problem to be solved by the present invention is to provide a control method and a control apparatus for a vehicle that allow the subject vehicle to start moving at appropriate timing during automated/autonomous travel control in which the subject vehicle is controlled to make a stop without depending on a brake operation performed by the driver.

The present invention solves the above problem by presenting start-moving command information before the preceding vehicle starts moving when detecting the stop of a preceding vehicle during execution of automated/autonomous travel control in which the subject vehicle is controlled to make a stop without depending on a braking operation performed by the driver.

According to the present invention, when the stop of the preceding vehicle is detected during execution of the automated/autonomous travel control in which the subject vehicle is controlled to make a stop without depending on the braking operation performed by the driver, the start-moving command information is presented thereby to allow the driver to command the subject vehicle to start moving at desired timing after the preceding vehicle makes a stop. The subject vehicle can therefore be controlled to start moving at appropriate timing even during the automated/autonomous travel control, as in the case of the manual driving performed by the driver.

DETAILED DESCRIPTION

Hereinafter, one or more embodiments of the present invention will be described with reference to the drawings. In the embodiments, a control apparatus for a vehicle equipped in the vehicle will be exemplified and described.

Figure 1:
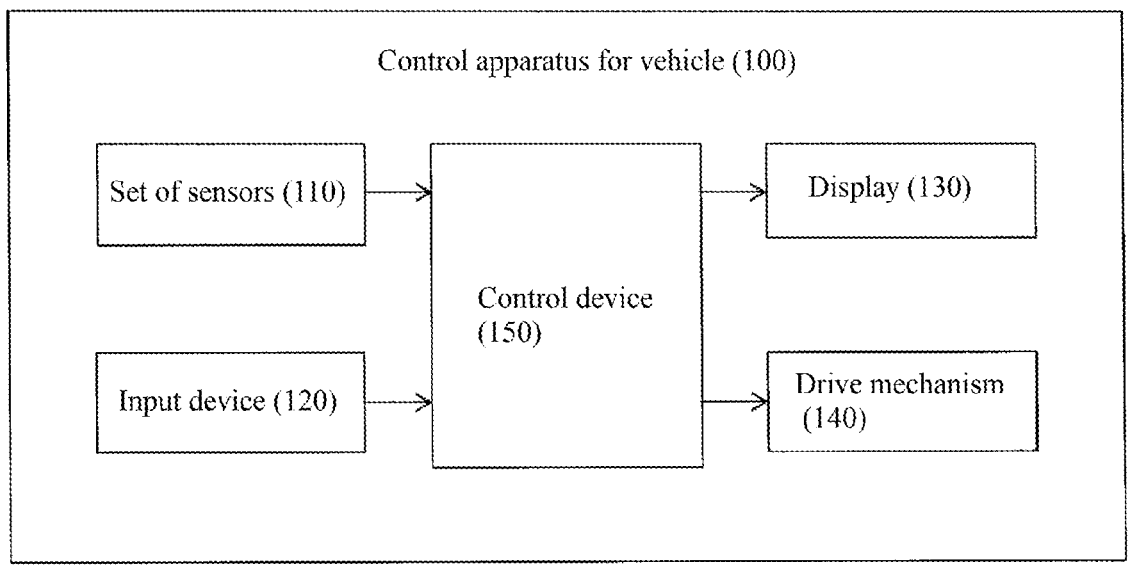
FIG. 1 is a block diagram illustrating a control apparatus for a vehicle according to one or more embodiments of the present invention.

FIG. 1 is a block diagram illustrating the configuration of a control apparatus for a vehicle 100 according to one or more embodiments of the present invention. As illustrated in FIG. 1, the control apparatus for a vehicle 100 includes a set of sensors 110, an input device 120, a display 130, a drive mechanism 140, and a control device 150. These devices are connected to one another via a controller area network (CAN) or other in-vehicle LAN for mutually exchanging information.

The set of sensors 110 is composed of a GPS device that detects the position of the subject vehicle, a vehicle speed sensor that detects the vehicle speed of the subject vehicle, a steering angle sensor that detects the steering angle of the subject vehicle, a ranging sensor that detects an obstacle around the subject vehicle and a lane in which the subject vehicle travels, a camera that captures an image around the subject vehicle, and other necessary components. Examples of the ranging sensor include a laser radar, an ultrasonic sensor, a sound wave sensor, and an infrared sensor.

The input device 120 is a device which the driver can operate, and includes, for example, various switches for the driver to perform operations related to the automated/autonomous travel control. Details of the switches related to the automated/autonomous travel control included in the input device 120 will be described later.

The display 130 presents various display information items, which represent the traveling state of the subject vehicle, on a screen of the display 130. Examples of such a display 130 include a display of the navigation device, a head-up display projected on the windshield, and a display incorporated in the instrument panel.

The drive mechanism 140 includes an engine, a brake, a steering actuator, and other necessary components for allowing the subject vehicle to travel. In the automated/autonomous travel control, which will be described later, the operation of the drive mechanism 140 is controlled by the control device 150.

The control device 150 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can also be used as an operating circuit.

The control device 150 executes the programs stored in the ROM using the CPU thereby to achieve a traveling state detection function of detecting the traveling state of the subject vehicle and a travel control function of performing travel control for the subject vehicle. These functions of the control device 150 will be described below.

The control device 150 uses the traveling state detection function to detect the traveling state of the subject vehicle. For example, the control device 150 can use the traveling state detection function to detect the position, traveling speed, and steering angle of the subject vehicle as the traveling state of the subject vehicle from the GPS device, vehicle speed sensor, and steering angle sensor included in the set of sensors 110. In addition or alternatively, the control device 150 can use the traveling state detection function to detect lane marks of the lane in which the subject vehicle travels as the traveling state of the subject vehicle from the ranging sensor and/or camera included in the set of sensors 110. In addition or alternatively, the control device 150 can use the traveling state detection function to detect the presence or absence of a preceding vehicle traveling ahead of the subject vehicle as the traveling state of the subject vehicle from the ranging sensor and/or camera included in the set of sensors 110. In addition, when such a preceding vehicle is present, the control device 150 can use the traveling state detection function to detect the distance from the subject vehicle to the preceding vehicle, the traveling speed of the preceding vehicle, etc. as the traveling state of the subject vehicle from the ranging sensor and/or camera included in the set of sensors 110.

The control device 150 uses the travel control function to execute the automated/autonomous travel control of automatically controlling the travel of the subject vehicle. For example, the control device 150 uses the travel control function to control the operation of the drive mechanism 140 such as the steering actuator so that the subject vehicle travels in the lane for the subject vehicle, on the basis of the lane marks of the lane for the subject vehicle detected using the traveling state detection function. This allows the control device 150 to perform the lane keeping control of controlling the traveling position of the subject vehicle in the road width direction. In addition, the control device 150 uses the travel control function to determine whether or not a preceding vehicle is present, on the basis of the detection result obtained using the traveling state detection function. Then, when no preceding vehicle is present, the control device 150 can use the travel control function to control the operation of the drive mechanism 140, such as the engine and/or brake, thereby to perform the constant-speed travel control in which the subject vehicle is controlled to travel at a certain vehicle speed that is set by the driver. On the other hand, when a preceding vehicle is present, the control device 150 can use the travel control function to control the operation of the drive mechanism 140, such as the engine and/or brake, thereby to perform the follow-up travel control in which the subject vehicle is controlled to travel so as to follow the preceding vehicle with an upper limit of the vehicle speed that is set by the driver. In one or more embodiments of the present invention, the lane keeping control, the follow-up travel control, and the constant-speed travel control are collectively referred to as the automated/autonomous travel control.

Figure 2:
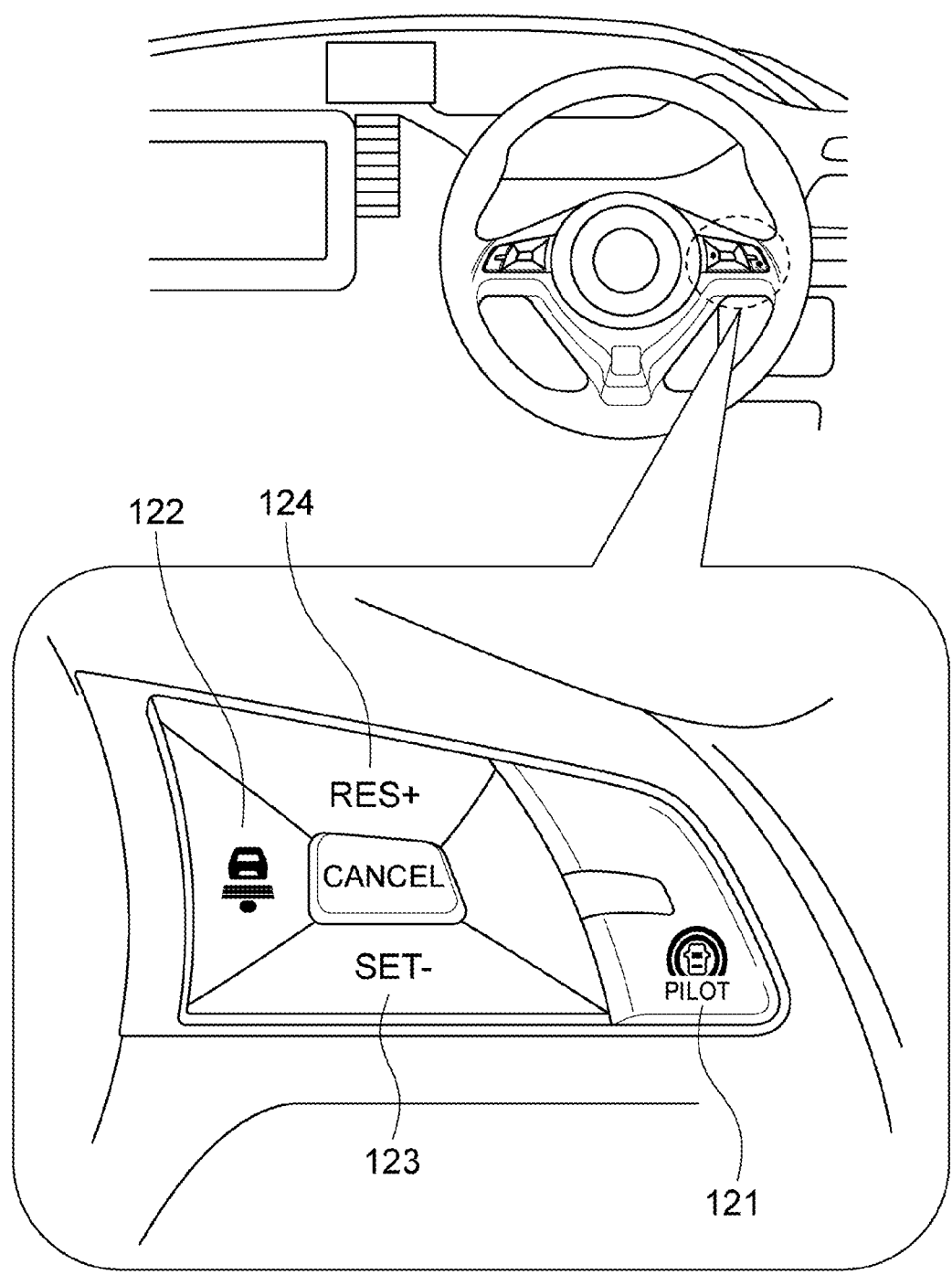
FIG. 2 is a diagram illustrating an example of an input device of FIG. 1.

FIG. 2 is a diagram illustrating an example of the input device 120 related to the automated/autonomous travel control (lane keeping control, follow-up travel control, and constant-speed travel control). In one or more embodiments of the present invention, the input device 120 includes an automated/autonomous travel control switch 121 for commanding ON/OFF of the automated/autonomous travel control, an inter-vehicle distance setting switch 122 for setting a set inter-vehicle distance in the follow-up travel control, a speed setting switch 123 for setting a set vehicle speed in the follow-up travel control and the constant-speed travel control, and a start-moving command switch 124 for commanding the subject vehicle to start moving when the subject vehicle is at a stop in the follow-up travel control.

In one or more embodiments of the present invention, the driver sets the automated/autonomous travel control switch 121 of the input device 120 to ON, so that the control device 150 uses the travel control function to start the automated/autonomous travel control which includes the lane keeping control, the follow-up travel control, and the constant-speed travel control. In addition, the driver can operate the inter-vehicle distance setting switch 122 of the input device 120 thereby to allow the control device 150 to set the set inter-vehicle distance (e.g. three stages of short, medium, and long) in the follow-up travel control, so that the travel control function serves to execute the follow-up travel control so as to follow the preceding vehicle at the set inter-vehicle distance which is set by the driver. Furthermore, the driver can operate the speed setting switch 123 of the input device 120 thereby to allow the control device 150 to set the set vehicle speed in the follow-up travel control and the constant-speed travel control. Thus, the control device 150 can use the travel control function to perform the follow-up travel control in which the subject vehicle is controlled to follow the preceding vehicle with an upper limit of the set vehicle speed that is set by the driver. In addition, the control device 150 can use the travel control function to execute the constant-speed travel control so that the subject vehicle travels at the set vehicle speed which is set by the driver.

In one or more embodiments of the present invention, when the preceding vehicle makes a stop during the follow-up travel control, the control device 150 uses the travel control function to perform a process in which the subject vehicle is controlled to make a stop in response to the stop of the preceding vehicle. Then, the control device 150 uses the travel control function to determine whether or not the subject vehicle is at a stop and whether or not the subject vehicle is in a state in which the subject vehicle can start moving. When the subject vehicle is at a stop and the subject vehicle is in a state in which the subject vehicle can start moving, the follow-up travel control is canceled and, instead, follow-up waiting control is performed to control the subject vehicle to make a stop until the driver issues a start-moving command. The following description is directed to a method of determining whether or not the subject vehicle is at a stop, a method of determining whether or not the subject vehicle is in a state in which the subject vehicle can start moving, and the follow-up waiting control of controlling the subject vehicle to make a stop until the driver issues a start-moving command.

In one or more embodiments of the present invention, with consideration for the detection error of the vehicle speed sensor, when a predetermined first period of time (e.g. several seconds) elapses after the traveling speed of the subject vehicle detected by the vehicle speed sensor becomes zero, the control device 150 uses the travel control function to determine that the subject vehicle is at a stop. The method of determining whether or not the subject vehicle is at a stop is not limited to the above method, and another method can also be employed in which, for example, when the traveling speed of the subject vehicle detected by the vehicle speed sensor becomes zero, a determination is made that the subject vehicle is at a stop. Until the first period of time elapses after the vehicle speed of the subject vehicle becomes zero, the follow-up travel control is continued to be performed. Accordingly, when the preceding vehicle starts moving again before the first period of time elapses after the vehicle speed of the subject vehicle becomes zero, the subject vehicle is controlled to automatically start moving again in response to the start of the preceding vehicle.

In one or more embodiments of the present invention, when the subject vehicle satisfies all of predetermined start-moving possible conditions, the control device 150 uses the travel control function to determine that the subject vehicle is in a state in which the subject vehicle can start moving. Specifically, in one or more embodiments of the present invention, when the following three start-moving possible conditions are all satisfied, the control device 150 uses the travel control function to determine that the subject vehicle is in a state in which the subject vehicle can start moving. The three start-moving possible conditions as used herein are that (1) the driver does not step on the brake pedal, (2) the steering angle of the steering is not a predetermined value or more, and (3) a notification message that notifies that the automated/autonomous travel control (lane keeping control, follow-up travel control, and constant-speed travel control) cannot be executed is not displayed. The notification message that notifies that the automated/autonomous travel control cannot be executed refers to a message or the like made in a specific case. For example, when the subject vehicle is controlled to make a stop during the follow-up travel control, the driver may unintentionally step on the brake pedal. In such a case, the driver is notified of a message that the travel by the automated/autonomous travel control cannot be executed because the driver steps on the brake pedal. The control device 150 can use the travel control function to determine whether or not the subject vehicle satisfies the above start-moving possible conditions, on the basis of the traveling state and the like of the subject vehicle detected using the traveling state detection function.

Then, when a determination is made that the subject vehicle is at a stop and the subject vehicle is in a state in which the subject vehicle can start moving, the control device 150 uses the travel control function to cancel the follow-up travel control of following the preceding vehicle and start the follow-up waiting control of controlling the subject vehicle to stop traveling until the driver issues a start-moving command. Specifically, the control device 150 uses the travel control function to perform the follow-up waiting control in which the display 130 is controlled to display on its screen the start-moving command information which reminds the driver of the start-moving command for the subject vehicle.

Figure 3A:
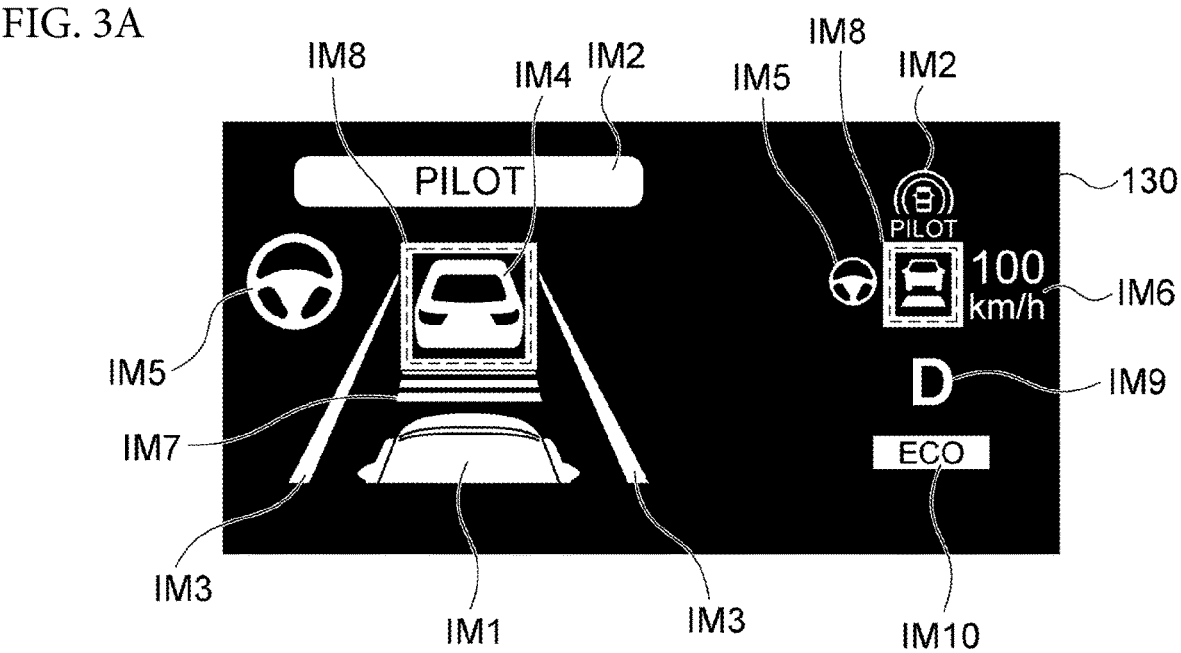
FIGS. 3A and 3B are a set of diagrams illustrating examples of screens displayed on the screen of a display in one or more embodiments of the present invention.
Figure 3B:
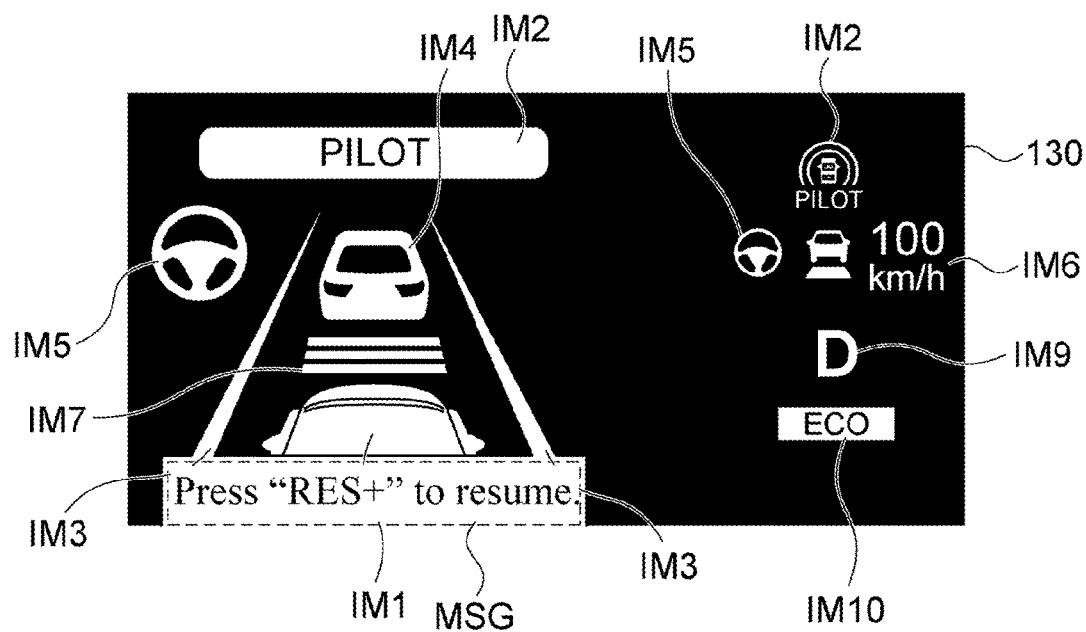

FIGS. 3A and 3B are a set of diagrams illustrating examples of screens displayed on the screen of the display 130. For example, when the control device 150 uses the travel control function to execute the automated/autonomous travel control (any control of the lane keeping control, the follow-up travel control, and the constant-speed travel control), the control device 150 can control the display 130 to display, as illustrated in FIG. 3A, an image IM1 that indicates the subject vehicle and images IM2 that indicate that the automated/autonomous travel control is being executed. In addition or alternatively, when detecting lane marks of the lane for the subject vehicle, the control device 150 can use the travel control function to control the display 130 to display images IM3 that indicate the lane marks of the lane for the subject vehicle. In addition or alternatively, when detecting a preceding vehicle, the control device 150 can use the travel control function to control the display 130 to display an image IM4 that indicates the preceding vehicle.

When the subject vehicle performs the steering control by the lane keeping control, the control device 150 can use the travel control function to control the display 130 to display, as illustrated in FIG. 3A, an image IM5 that indicates that the steering control is performed. In addition or alternatively, the control device 150 can use the travel control function to control the display 130 to display an image IM6 that indicates the set vehicle speed which is set by the driver and/or an image IM7 that indicates the set inter-vehicle distance which is set by the driver. In addition or alternatively, when the control device 150 uses the travel control function to perform the follow-up travel control in which the subject vehicle is controlled to follow the preceding vehicle, the control device 150 can control the display 130 to display a frame line IM8 that surrounds the image of the preceding vehicle which is an object of the follow-up travel control. In addition or alternatively, the control device 150 can use the travel control function to control the display 130 to display, as illustrated in FIG. 3A, an image IM9 that indicates the shift position of the subject vehicle and/or an image IM10 that indicates the travel mode of the subject vehicle.

In the case in which the subject vehicle performs the follow-up travel control, when the subject vehicle is controlled to make a stop in response to the stop of the preceding vehicle and the subject vehicle is in a state in which the subject vehicle can start moving, the control device 150 can control the display 130 to display, as illustrated in FIG. 3B, start-moving command information MSG that remind the driver of the start-moving command for the subject vehicle. For example, the control device 150 can use the travel control function to control the display 130 to display, as illustrated in FIG. 3B, the start-moving command information such as "Press RES+ (start-moving command switch 124) to resume." Then, in response to the start-moving command information, the driver sets the start-moving command switch 124 illustrated in FIG. 2 to ON thereby to allow the start-moving command switch 124 to output a signal that indicates that the start-moving command switch 124 is turned on, to the control device 150. Then, when the control device 150 receives the ON signal of the start-moving command switch 124, the control device 150 uses the travel control function to switch the control from the follow-up waiting control to the follow-up travel control in which the operation of the drive mechanism 140, such as the engine and/or brake, is controlled to allow the subject vehicle to start moving. Through this operation, when the subject vehicle is controlled to make a stop in response to the stop of the preceding vehicle in the follow-up travel control, the control device 150 according to one or more embodiments of the present invention can control the subject vehicle to start moving at the timing desired by the driver, provided that the subject vehicle is ready to start moving.

When the driver sets the start-moving command switch 124 to ON to command the subject vehicle to start moving, the control device 150 uses the travel control function to switch the control from the follow-up waiting control to the follow-up travel control, but in a case in which the preceding vehicle is still in a state of being at a stop and the subject vehicle cannot start moving, when a predetermined second period of time elapses after the start-moving command issued by the driver and the subject vehicle is in a state in which the subject vehicle can start moving, the control is switched again from the follow-up travel control to the follow-up waiting control in which the display 130 is controlled to display the start-moving command information on the screen of the display 130. Thus, when the driver sets the start-moving command switch 124 to ON to command the subject vehicle to start moving, but nevertheless, the subject vehicle cannot start moving because the preceding vehicle is at a stop, the start-moving command information is presented again to the driver after the second period of time elapses.

Figure 4:
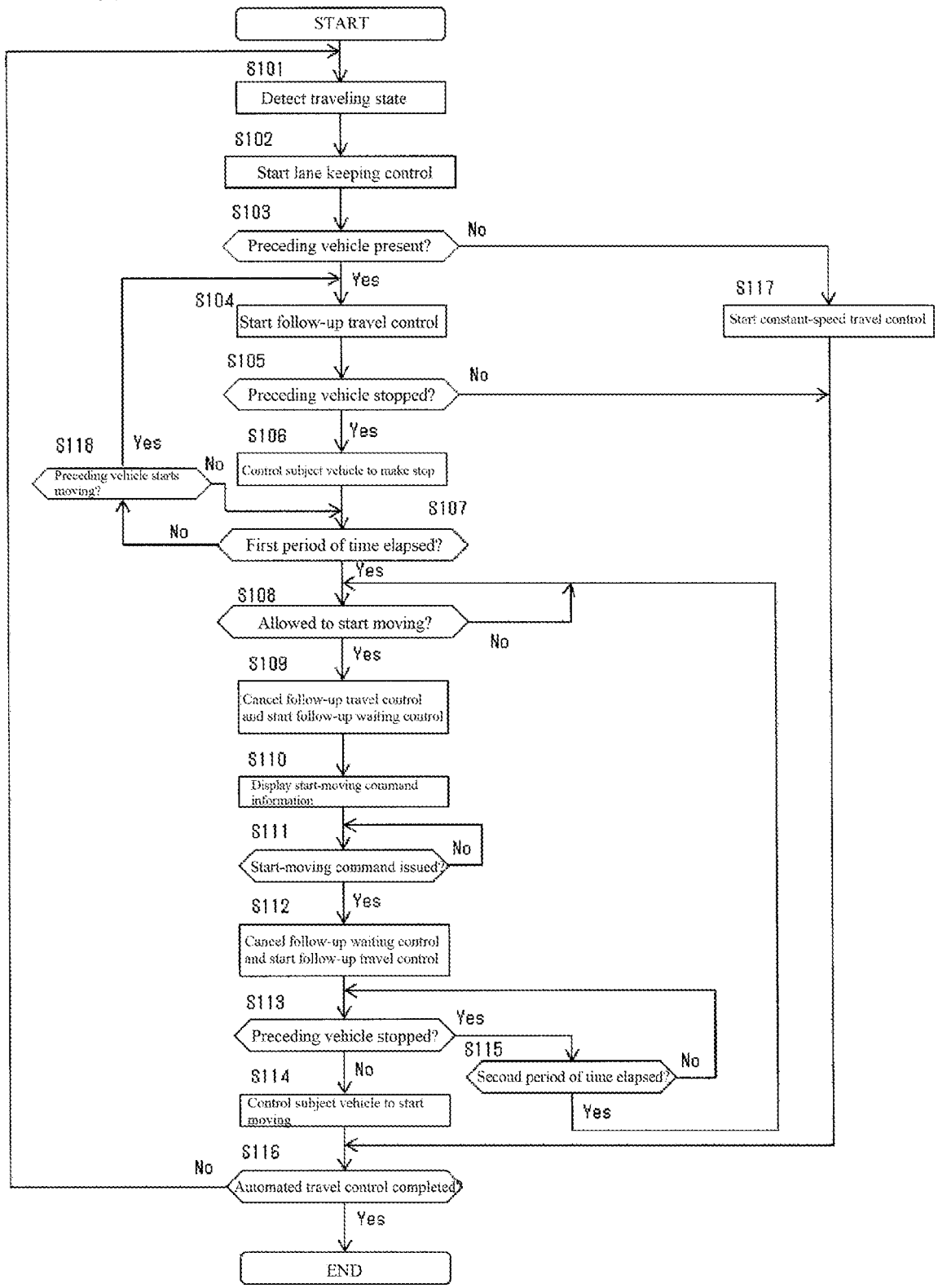
FIG. 4 is a flowchart illustrating a control process for a vehicle according to one or more embodiments of the present invention.

The travel control process according to one or more embodiments of the present invention will then be described with reference to FIG. 4. FIG. 4 is a flowchart illustrating the travel control process performed by the control device 150 according to one or more embodiments of the present invention. The travel control process, which will be described below, is started when the driver sets the automated/autonomous travel control switch 121 to ON.

First, in step S101, the control device 150 uses the traveling state detection function to detect the traveling state of the subject vehicle. For example, the control device 150 can use the traveling state detection function to detect, as the traveling state of the subject vehicle, the positional information of the subject vehicle from the GPS device included in the set of sensors 110, the vehicle speed information of the subject vehicle from the vehicle speed sensor, the steering angle of the subject vehicle from the steering angle sensor, the lane information of the lane, in which the subject vehicle travels, from the camera, and the information on the presence or absence of a preceding vehicle and the position and speed of the preceding vehicle from the ranging sensor and/or the camera. Also in the subsequent steps after step S101, the control device 150 uses the traveling state detection function to periodically detect various information items that represent the traveling state of the subject vehicle.

In step S102, the control device 150 uses the travel control function to start the lane keeping control. For example, the control device 150 can use the travel control function to control the operation of the drive mechanism 140 such as the steering actuator on the basis of the lane marks of the lane for the subject vehicle, which are detected in step S101, thereby to perform the lane keeping control of controlling the traveling position of the subject vehicle in the road width direction.

In step S103, the control device 150 uses the travel control function to determine whether or not a preceding vehicle is present, on the basis of the detection result of a preceding vehicle detected in step S101. When a preceding vehicle is present, the process proceeds to step S104 in which the travel control function serves to start the follow-up travel control of controlling the subject vehicle to follow the preceding vehicle at the set inter-vehicle distance which is set by the driver. On the other hand, when no preceding vehicle is present, the process proceeds to step S117 in which the travel control function serves to start the constant-speed travel control of controlling the subject vehicle to travel at the set vehicle speed which is set by the driver.

The constant-speed travel control executed in step S117 is followed by step S116 in which a determination is made as to whether or not the automated/autonomous travel control is completed. When the automated/autonomous travel control is not completed, the process returns to step S101. Then, when a preceding vehicle appears (step S103=Yes), the follow-up travel control is started (step S104), while when no preceding vehicle appears (step S103=No), the constant-speed travel control is continued to be executed (step S117).

After the follow-up travel control is started in step S104, the process proceeds to step S105. In step S105, the travel control function serves to determine whether or not the preceding vehicle is at a stop. For example, the travel control function can serve to determine whether or not the preceding vehicle is at a stop, on the basis of the position and/or speed of the preceding vehicle detected in step S101. When a determination is made that the preceding vehicle is at a stop, the process proceeds to step S106, while when a determination is made that the preceding vehicle is not at a stop, the process proceeds to step S116. The determination that the preceding vehicle is not at a stop is followed by step S116 in which a determination is made as to whether or not the automated/autonomous travel control is completed. Then, when the automated/autonomous travel control is not completed, the process returns to step S101 to continue the follow-up travel control (step S104) upon the presence of a preceding vehicle (step S103=Yes), and when the preceding vehicle is no longer present (step S103=No), the constant-speed travel control is started (step S117).

In step S106, the travel control function serves to perform a process of controlling the subject vehicle to stop traveling because the determination is made that the preceding vehicle is at a stop during the follow-up travel control. For example, the control device 150 can use the travel control function to control the operation of the drive mechanism 140, such as the engine and/or brake, thereby to control the subject vehicle to stop traveling.

In step S107, the travel control function serves to determine whether or not the predetermined first period of time (e.g. several seconds) elapses after the vehicle speed becomes zero. In one or more embodiments of the present invention, with consideration for the detection error of the vehicle speed sensor, when the first period of time elapses after the vehicle speed of the subject vehicle becomes zero due to the process of controlling the subject vehicle to stop traveling in step S106, a determination is made that the subject vehicle is at a stop. Accordingly, until the first period of time elapses after the vehicle speed becomes zero, a determination is made that the subject vehicle is not at a stop and the process waits in step S107, and when the first period of time elapses after the vehicle speed becomes zero, a determination is made that the subject vehicle is at a stop and the process proceeds to step S108. Until the first period of time elapses after the vehicle speed of the subject vehicle becomes zero, the follow-up travel control is continued to be performed. Accordingly, when the preceding vehicle once at a stop starts moving while the first period of time elapses, the subject vehicle is controlled to start moving even without a command issued by the driver (step S107=No→step S118=Yes→step S104).

In step S108, the travel control function serves to determine whether or not the subject vehicle is in a state in which the subject vehicle can start moving. In one or more embodiments of the present invention, when the following three start-moving possible conditions are all satisfied, for example, the travel control function serves to determine that the subject vehicle is in a state in which the subject vehicle can start moving. The three start-moving possible conditions as used herein are that (1) the driver does not step on the brake pedal, (2) the steering angle of the steering is not a predetermined value or more, and (3) a notification message that notifies the driver of the fact that the automated/autonomous travel control (lane keeping control, follow-up travel control, and constant-speed travel control) cannot be executed is not displayed. When the subject vehicle is not in a state in which the subject vehicle can start moving, the process waits in step S108 until the subject vehicle comes to a state in which the subject vehicle can start moving, while when the subject vehicle is in a state in which the subject vehicle can start moving, the process proceeds to step S109.

In step S109, the travel control function serves to cancel the follow-up travel control and start the follow-up waiting control. The follow-up travel control is canceled and the follow-up waiting control is started, so that the follow-up to the preceding vehicle is prohibited, and even when the preceding vehicle starts moving, the subject vehicle remains stopped until the driver issues a command. Then, the control device 150 uses the travel control function to execute the process of steps S110 to S111 as the follow-up waiting control.

This will be more specifically described. In step S110, the travel control function serves to display the start-moving command information. For example, the control device 150 can use the travel control function to control the display 130 to display on its screen the start-moving command information, such as "Press RES+ (start-moving command switch 124) to resume," as illustrated in FIG. 3B. Then, in step S111, the travel control function serves to determine whether or not the driver commands the subject vehicle to start moving in response to the start-moving command information displayed in step S110. For example, when the driver sets the start-moving command switch 124 to ON, the travel control function can serve to determine that the driver commands the subject vehicle to start moving. When the driver does not command the subject vehicle to start moving, the process waits in step S111 until the driver commands the subject vehicle to start moving, and when the driver commands the subject vehicle to start moving, the process proceeds to step S112.

In step S112, the travel control function serves to cancel the follow-up waiting control and start the follow-up travel control. Then, in step S113, the travel control function serves to determine whether or not the preceding vehicle is at a stop. When the preceding vehicle is at a stop even after the driver commands the subject vehicle to start moving and the follow-up travel control is started, the process proceeds to step S115. In step S115, the travel control function serves to determine whether or not the predetermined second period of time elapses after the driver commands the subject vehicle to start moving. The second period of time may be or may not be the same as the first period of time. Then, until the second period of time elapses after the driver commands the subject vehicle to start moving (step S115=No), the process returns to step S113 from which the travel control function serves to repeatedly make a determination as to whether or not the preceding vehicle is at a stop (step S113) and a determination as to whether or not the second period of time elapses (step S115). Then, when the second period of time elapses after the driver commands the subject vehicle to start moving, the process returns to step S108, and when the subject vehicle is in a state in which the subject vehicle can start moving (step S108=Yes), the start-moving command information is displayed again on the display 130 (step S110).

When, in step S113, a determination is made that the preceding vehicle starts moving before the second period of time elapses after the driver commands the subject vehicle to start moving, the process proceeds to step S114 in which the travel control function serves to control the subject vehicle to start moving.

Then, in step S116, the travel control function serves to determine whether or not the automated/autonomous travel control is completed. For example, when the driver sets the automated/autonomous travel control switch 121 to OFF, the control device 150 can use the travel control function to determine that the automated/autonomous travel control is completed. When the automated/autonomous travel control is not completed, the process returns to step S101 from which the travel control process of FIG. 4 is continued to be executed. Then, when the automated/autonomous travel control is completed, the travel control process of FIG. 4 is concluded.

Figure 5:
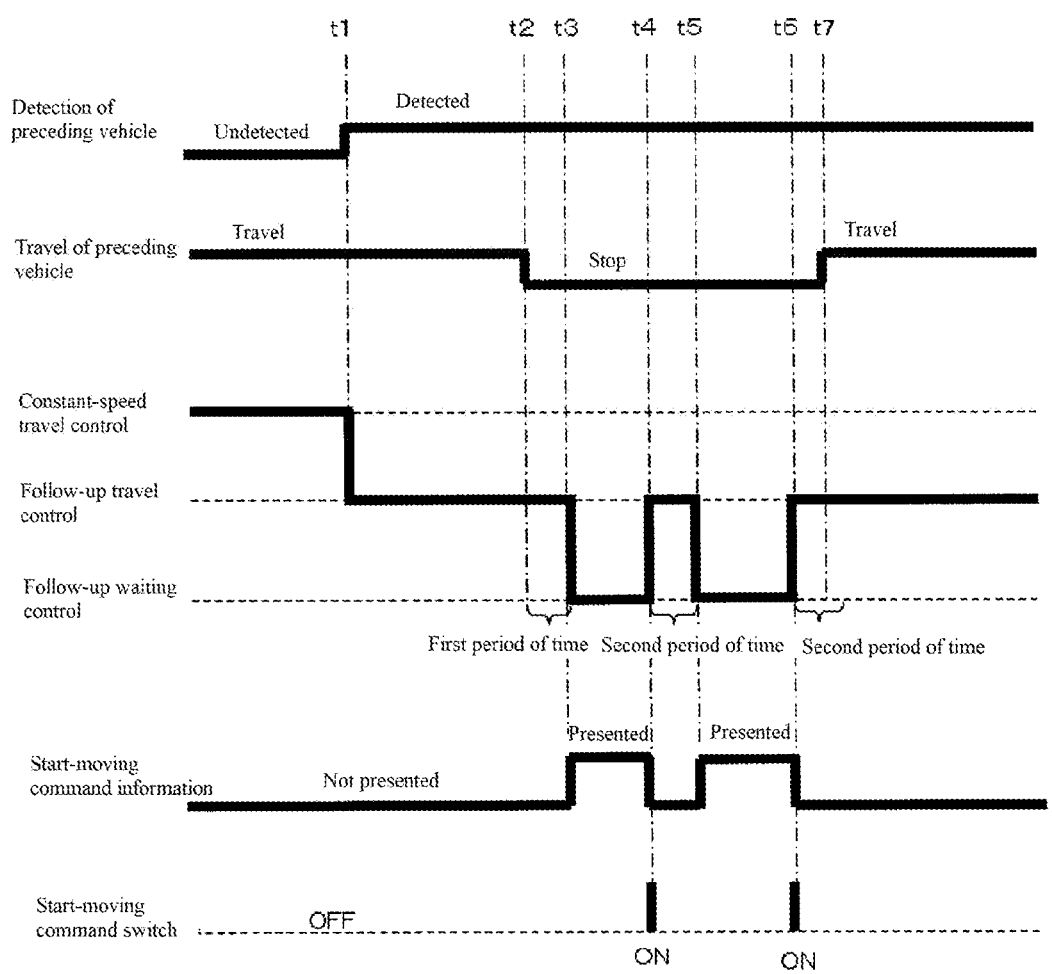
FIG. 5 is a diagram for describing the control process for a vehicle according to one or more embodiments of the present invention.

With reference to FIG. 5, the travel control process according to one or more embodiments of the present invention will then be described. FIG. 5 is a diagram for describing the travel control process according to one or more embodiments of the present invention. For example, in the example illustrated in FIG. 5, no preceding vehicle is present until the time t1 (step S103=No) and the control device 150 therefore uses the travel control function to execute the constant-speed travel control (step S117→step S116→step S101→step S102→step S103). Then, when a preceding vehicle is detected at the time t1 (step S103=Yes), the control device 150 uses the travel control function to execute the follow-up travel control (step S104).

Further, in the example illustrated in FIG. 5, during the period from the time t1 to the time t2, the control device 150 uses the travel control function to execute the follow-up travel control in which the subject vehicle is controlled to travel to follow the preceding vehicle (step S104→step S105=No→step S116→step S101→step S102→step S103=Yes→step S104). Then, when the preceding vehicle makes a stop at the time t2 (step S105=Yes), the control device 150 uses the travel control function to control the subject vehicle to make a stop in response to the stop of the preceding vehicle (step S106). In one or more embodiments of the present invention, as illustrated in FIG. 5, the follow-up travel control is continued to be performed until the predetermined first period of time elapses after the subject vehicle is controlled to make a stop (after the vehicle speed of the subject vehicle becomes zero). Accordingly, if the preceding vehicle once at a stop starts moving during the period from the time t2 to the time t3, the subject vehicle is controlled to automatically start moving even without a command issued by the driver.

Then, at the time t3, when the first period of time elapses after the vehicle speed of the subject vehicle becomes zero (step S107=Yes) and the subject vehicle is in a state in which the subject vehicle can start (step S108=Yes), the control device 150 cancels the follow-up travel control and starts the follow-up waiting control (step S109). Through this operation, at the time t3, the control device 150 performs a process in which, as illustrated in FIG. 2(B), the start-moving command information is displayed on the screen of the display 130 (step S110).

In the example illustrated in FIG. 5, at the time t4 during the period in which the start-moving command information is displayed on the screen of the display 130 from the time t3, the driver presses the start-moving command switch 124 thereby to command the subject vehicle to start moving (step S111=Yes), so that the follow-up waiting control is canceled at the time t4 to resume the follow-up travel control (step S112). In the example illustrated in FIG. 5, however, the preceding vehicle remains stopped at the time t4 (step S113=Yes) and the subject vehicle is therefore controlled to wait while continuing the follow-up travel control until the predetermined second period of time elapses after the driver commands the subject vehicle to start moving (step S115=No). Then, at the time t5, when the second period of time elapses after the driver commands the subject vehicle to start moving (step S115=Yes) and the subject vehicle is in a state in which the subject vehicle can start moving (step S108=Yes), the follow-up travel control is canceled again to start the follow-up waiting control (step S109) and the start-moving command information is displayed again (step S110).

In the example illustrated in FIG. 5, when, at the time t6 during the period in which the start-moving command information is displayed on the screen of the display 130 from the time t5, the driver presses the start-moving command switch 124 thereby again to command the subject vehicle to start moving (step S111=Yes), the follow-up waiting control is canceled to start the follow-up travel control (step S112). In the example illustrated in FIG. 5, however, the preceding vehicle has not yet start moving at the time t6 (step S113=Yes) and the subject vehicle is therefore controlled to wait while continuing the follow-up travel control, and a determination is made as to whether or not the second period of time elapses (step S115). In the example illustrated in FIG. 5, the preceding vehicle starts moving at the time t7 before the second period of time elapses (step S115=No, step S113=No), so that the control device 150 performs the follow-up travel control to control the subject vehicle to start moving (step S113). Thus, in one or more embodiments of the present invention, it is possible to command the subject vehicle to start moving before the preceding vehicle starts moving, and when the preceding vehicle starts moving before the second period of time elapses after commanding the subject vehicle to start moving, the subject vehicle can be controlled to start moving immediately after the preceding vehicle starts moving.

As described above, in one or more embodiments of the present invention, when the stop of a preceding vehicle is detected during the automated/autonomous travel control in which the subject vehicle is controlled to make a stop without depending on the braking operation performed by the driver, the start-moving command information for reminding the driver of a start-moving command for the subject vehicle is presented. More specifically, during the automated/autonomous travel control in which the subject vehicle is controlled to make a stop without depending on the braking operation performed by the driver, a determination is made as to whether or not the subject vehicle makes a stop, and the start-moving command information which reminds the driver of the start-moving command for the subject vehicle is presented at the timing when the determination is made that the subject vehicle makes a stop. This allows the driver to command the subject vehicle to start moving at desired timing after the subject vehicle makes a stop (e.g. before the preceding vehicle starts moving or before the traffic signal changes to a signal that permits the subject vehicle to travel) even when the subject vehicle makes a stop in the automated/autonomous travel control. The subject vehicle can therefore be controlled to start moving at appropriate timing which the driver desires, as in the case in which the driver performs the manual driving.

In one or more embodiments of the present invention, the automated/autonomous travel control includes the follow-up travel control in which the subject vehicle is controlled to travel to follow the preceding vehicle, and when the subject vehicle is controlled to make a stop due to the stop of the preceding vehicle during the follow-up travel control, the start-moving command information is presented. Through this operation, even when the subject vehicle is controlled to make a stop in response to the stop of the preceding vehicle in the follow-up travel control, the subject vehicle can be controlled to start moving at the timing which the driver desires, as in the case in which the driver controls the subject vehicle to make a stop in response to the stop of the preceding vehicle, and the subject vehicle can therefore be controlled to appropriately follow the preceding vehicle.

In one or more embodiments of the present invention, when the predetermined first period of time elapses after the vehicle speed of the subject vehicle becomes zero, a determination is made that the subject vehicle is at a stop, and the start-moving command information is presented. This makes it possible to appropriately determine whether or not the subject vehicle is at a stop even when the detection error of the vehicle speed sensor occurs, and the start-moving command information can be presented at appropriate timing when the subject vehicle is controlled to make a stop.

In one or more embodiments of the present invention, until the first period of time elapses after the vehicle speed of the subject vehicle becomes zero, the follow-up travel control is continued, and when the first period of time elapses, the follow-up control is canceled and the follow-up waiting control is started. In addition, when the driver commands the subject vehicle to start moving during the follow-up waiting control, the follow-up travel control is started to control the subject vehicle to start moving. Through this operation, when the subject vehicle is controlled to temporarily make a stop due to a temporary stop of the preceding vehicle (when the subject vehicle is controlled to start moving before the first period of time elapses), for example, the subject vehicle can be controlled to automatically start moving even without a command issued by the driver and it is therefore possible to effectively prevent the driver from being bothered by issuing a start-moving command. Moreover, when the subject vehicle is controlled to be at a stop for the first period of time or more because the preceding vehicle is at a stop for the first period of time or more due to the stop at a red light or the like, the subject vehicle can be controlled to start moving on the basis of the driver's intention.

In one or more embodiments of the present invention, in a case in which the driver commands the subject vehicle to start moving during the follow-up waiting control and the follow-up travel control is started, when the subject vehicle is at a stop until the predetermined second period of time elapses because the preceding vehicle is at a stop, the start-moving command information is presented again. This allows the driver to issue the start-moving command again when the preceding vehicle does not start moving.

In one or more embodiments of the present invention, when the operation of the brake pedal is performed by the driver, a determination is made that the subject vehicle is not in a state in which the subject vehicle can start moving, and specific control is performed so as not to present the start-moving command information. When the operation of the brake pedal is performed by the driver, there is a possibility that the driver is operating the brake pedal so as not to start the subject vehicle. Thus, when the driver may intentionally restrain the subject vehicle from moving, the start-moving command information is not presented and it is thereby possible to effectively prevent the driver from being bothered by the presentation of the start-moving command information. In one or more embodiments of the present invention, also when the steering angle is a predetermined value or more, a determination is made that the subject vehicle is not in a state in which the subject vehicle can start moving, and specific control is performed so as not to present the start-moving command information. The purpose of this operation is to prevent the subject vehicle from abruptly turning due to the start-moving command issued by the driver when the steering angle is a predetermined value or more.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, a configuration is exemplified in which the start-moving command information is presented to the driver when the subject vehicle is controlled to make a stop in response to the stop of a preceding vehicle during the follow-up travel control for the subject vehicle to follow the preceding vehicle, but the present invention is not limited to this configuration, and another configuration may also be employed in which, for example, the start-moving command information is presented to the driver when the subject vehicle makes a stop due to the stop at a red light or the like in a case in which the constant-speed travel control is performed because no preceding vehicle is detected.

In the above-described embodiments, a configuration is exemplified in which the driver sets the start-moving command switch 124 of the input device 120 to ON thereby to command the subject vehicle to start moving, but in addition or alternatively to this configuration, a configuration can be employed in which, for example, the subject vehicle is commanded to start moving when the driver steps on the acceleration pedal. In addition or alternatively, a configuration may be employed in which the subject vehicle is commanded to start moving by using a microphone included in the input device 120 and/or a motion detection sensor that detects the motion of the driver.

In the above-described embodiments, a configuration is exemplified in which the start-moving command information is displayed on the screen of the display 130, but the present invention is not limited to this configuration, and another configuration can also be employed in which, for example, the start-moving command information is output as sound or voice using a speaker thereby to present the start-moving command information to the driver.

In the above-described embodiments, a configuration is exemplified in which, in the case of commanding the subject vehicle to start moving before the preceding vehicle starts moving, the subject vehicle is controlled to start moving when the preceding vehicle starts moving, but the present invention is not limited to this configuration, and another configuration can also be employed in which, for example, in the case of commanding the subject vehicle to start moving before the preceding vehicle starts moving, when the inter-vehicle distance between the subject vehicle and the preceding vehicle is a certain distance or more, the subject vehicle is controlled to start moving at a low speed even if the preceding vehicle does not start moving. This allows the subject vehicle to slowly start moving at the timing when a vehicle located ahead of the subject vehicle with a few vehicles starts moving, such as in a traffic jam. As a result, as in the case in which the driver performs the driving, the subject vehicle can be controlled to follow the preceding vehicle, which is located just ahead of the subject vehicle, at a speed corresponding to that of the preceding vehicle at the timing when the preceding vehicle starts moving.

In one or more embodiments of the present invention, when the stop of the preceding vehicle is detected during the execution of the automated/autonomous travel control in which the subject vehicle is controlled to make a stop without depending on the braking operation performed by the driver, the start-moving command information for reminding the driver of the start-moving command for the subject vehicle may be presented regardless of the state of the subject vehicle, such as whether or not the subject vehicle is at a stop (step S106 of FIG. 4), whether or not the predetermined first period of time elapses after the vehicle speed of the subject vehicle becomes zero (step S107 of FIG. 4), whether or not the subject vehicle is in a state in which the subject vehicle can start moving (step S108 of FIG. 4), or whether or not the control mode transitions from the follow-up travel control to the follow-up waiting control (step S109 of FIG. 4).

The above-described set of sensors 110, control device 150, and display 130 correspond to the presentation device in the present invention, and the set of sensors 110, input device 120, and control device 150 correspond to the travel controller in the present invention.

DESCRIPTION OF REFERENCE NUMERALS

100 Control apparatus for vehicle
110 Set of sensors
120 Input device
130 Display
140 Drive mechanism
150 Control device

The invention claimed is:
1. A control method for a vehicle, comprising:
executing automated follow-up travel control in which a subject vehicle is controlled to follow-up a preceding vehicle and to make a stop without depending on a braking operation performed by a driver;
presenting start-moving command information, wherein the start-moving command information reminds the driver of a driver command used for the subject vehicle before the preceding vehicle starts moving, comprising:
determining that the subject vehicle and the preceding vehicle are at a stop during execution of the automated travel control;
determining that the driver does not step on a brake pedal;
determining that a steering angle of steering is not a predetermined value or more;
determining that a follow up control of autonomous driving is executable; and
presenting the start-moving command information at a first time; and
controlling the subject vehicle to start moving, comprising:
commanding, by the driver command, the subject vehicle to start moving after the start-moving information is presented;
determining whether the preceding vehicle is at a stop;
after a period of time is determined while the preceding vehicle is at a stop, presenting the start moving command at a second time;
commanding, by the driver command, the subject vehicle to start moving after the start-moving information is presented for the second time;
detecting the preceding vehicle for which the stop is detected starts moving; and controlling, by a control device, the subject vehicle to start moving.

2. The control method for a vehicle according to claim 1, wherein when the subject vehicle makes the stop by detecting a stop of the preceding vehicle during the follow-up travel control in which the subject vehicle is controlled to travel to follow the preceding vehicle, the start-moving command information is presented.

3. The control method for a vehicle according to claim 2, wherein when a predetermined first period of time elapses after a vehicle speed of the subject vehicle becomes zero, a determination is made that the subject vehicle is at the stop.

4. The control method for a vehicle according to claim 3, wherein
until the first period of time elapses after the vehicle speed of the subject vehicle becomes zero, the follow-up travel control is continued so that the subject vehicle is controlled to travel to follow the preceding vehicle, and
after the first period of time elapses, the start-moving command information is presented and the follow-up travel control is canceled to execute follow-up waiting control of controlling the subject vehicle to make the stop until the driver commands the subject vehicle to start moving.

5. The control method for a vehicle according to claim 4, wherein when the driver commands the subject vehicle to start moving during the follow-up waiting control, the follow-up waiting control is canceled to execute the follow-up travel control.

6. The control method for a vehicle according to claim 1, wherein
when the driver commands the subject vehicle to start moving, discontinuing the presentation of the start-moving command information.

7. A control method for a vehicle, comprising:
executing automated follow-up travel control in which a subject vehicle is controlled to follow-up a preceding vehicle and to make a stop without depending on a braking operation performed by a driver;
when the subject vehicle and the preceding vehicle are at a stop during execution of the automated travel control and when the driver is not stepping on a brake pedal or a steering angle of steering is not a predetermined value or more, presenting start-moving command information at a first time for reminding the driver of a start-moving command for the subject vehicle before the preceding vehicle starts moving; and
when the driver commands the subject vehicle to start moving after the start-moving command information is presented at the first time and when it is detected that the preceding vehicle for which the stop is detected starts moving, determining that the preceding vehicle is at a stop;
after a period of time, presenting the start-moving command for a second time; and
after the start-moving command is presented at the second time and after the driver commands the subject vehicle to start moving, controlling the subject vehicle to start moving.

8. A control apparatus for a vehicle, comprising:
a travel controller configured to execute automated follow-up travel control in which a subject vehicle is controlled to follow-up a preceding vehicle and to make a stop without depending on a braking operation performed by a driver; and
a presentation device configured to, when the subject vehicle and the preceding vehicle are at a stop during execution of the automated travel control, present a start-moving command information at a first time for reminding the driver of a start-moving command for the subject vehicle before the preceding vehicle starts moving,
the travel controller being further configured to, when the driver commands the subject vehicle to start moving after the start-moving command information is presented and when it is detected that the preceding vehicle for which the stop is detected starts moving, control the subject vehicle to start moving,
wherein when a predetermined first period of time elapses and a determination is made that the driver does not step on a brake pedal, a steering angle of steering is not a predetermined value or more, and the follow-up travel control can be executed are satisfied, the start-moving command information is presented, and
wherein when the preceding vehicle is determined to be at a stop for a period of time after the driver commands the subject vehicle to start moving, the presentation device is configured to display the start-move command at a second time.

9. The control method for a vehicle according to claim 1, wherein the preceding vehicle immediately precedes the subject vehicle with no intervening vehicles between the subject vehicle and the preceding vehicle.

* * * * *